May 7, 1940.　　A. J. COBHAM ET AL　　2,199,588
APPARATUS FOR REFUELING AIRCRAFT IN THE AIR
Filed May 10, 1938　　4 Sheets-Sheet 4
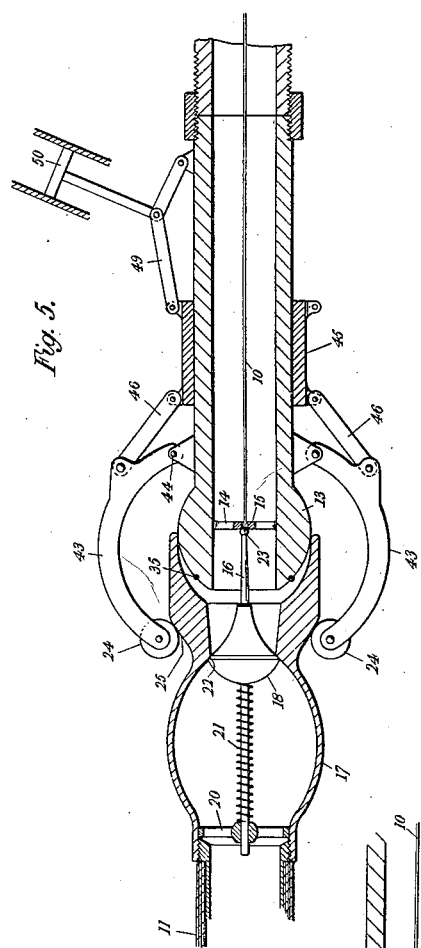
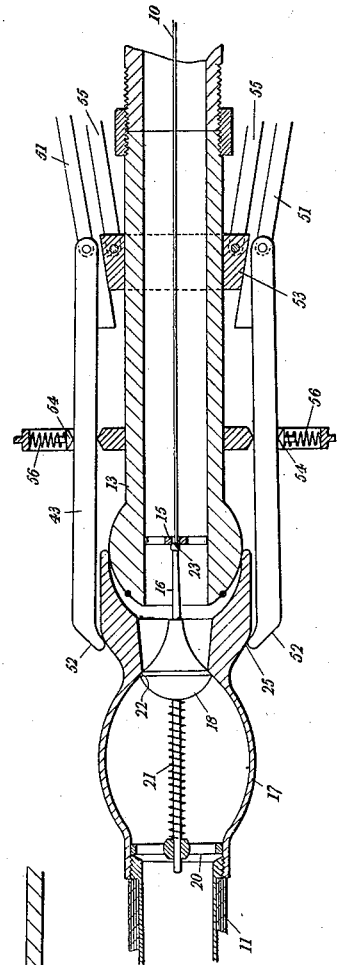
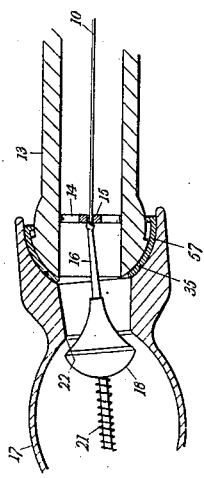

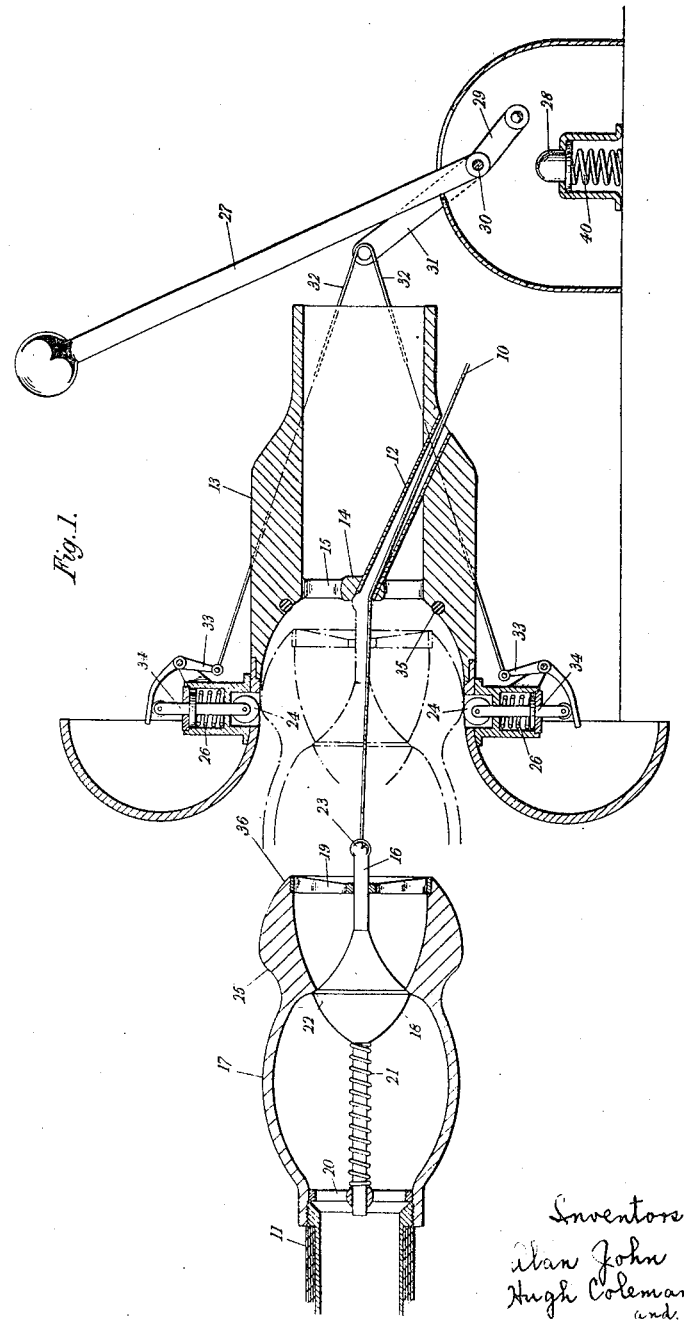

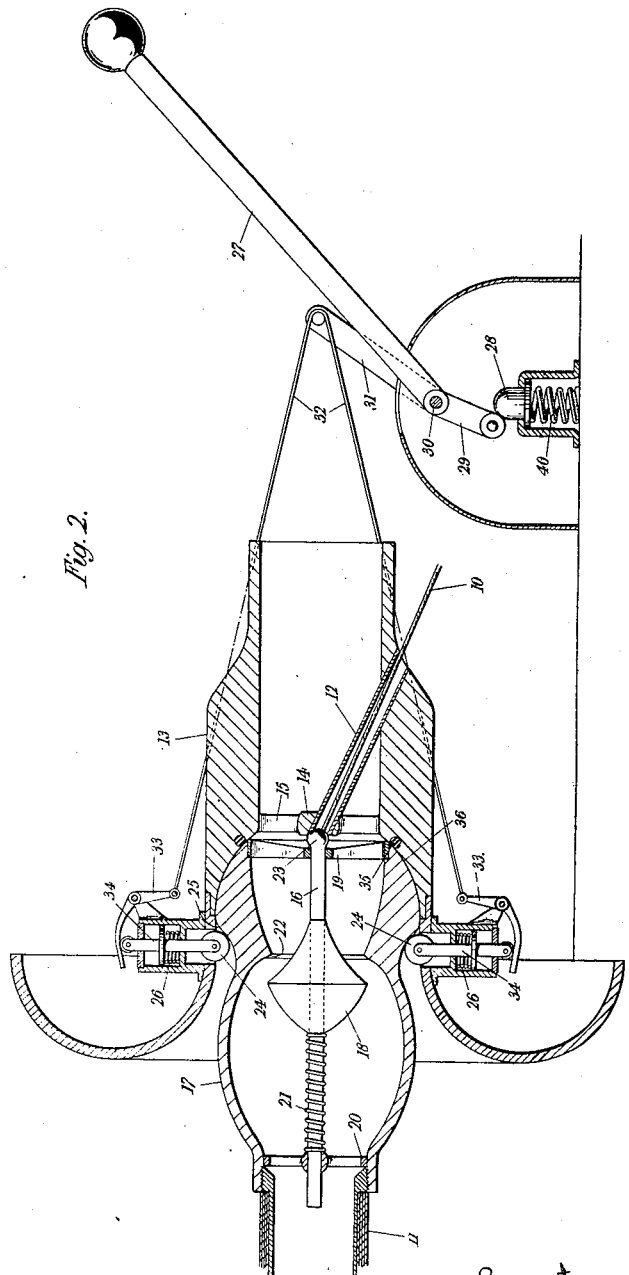

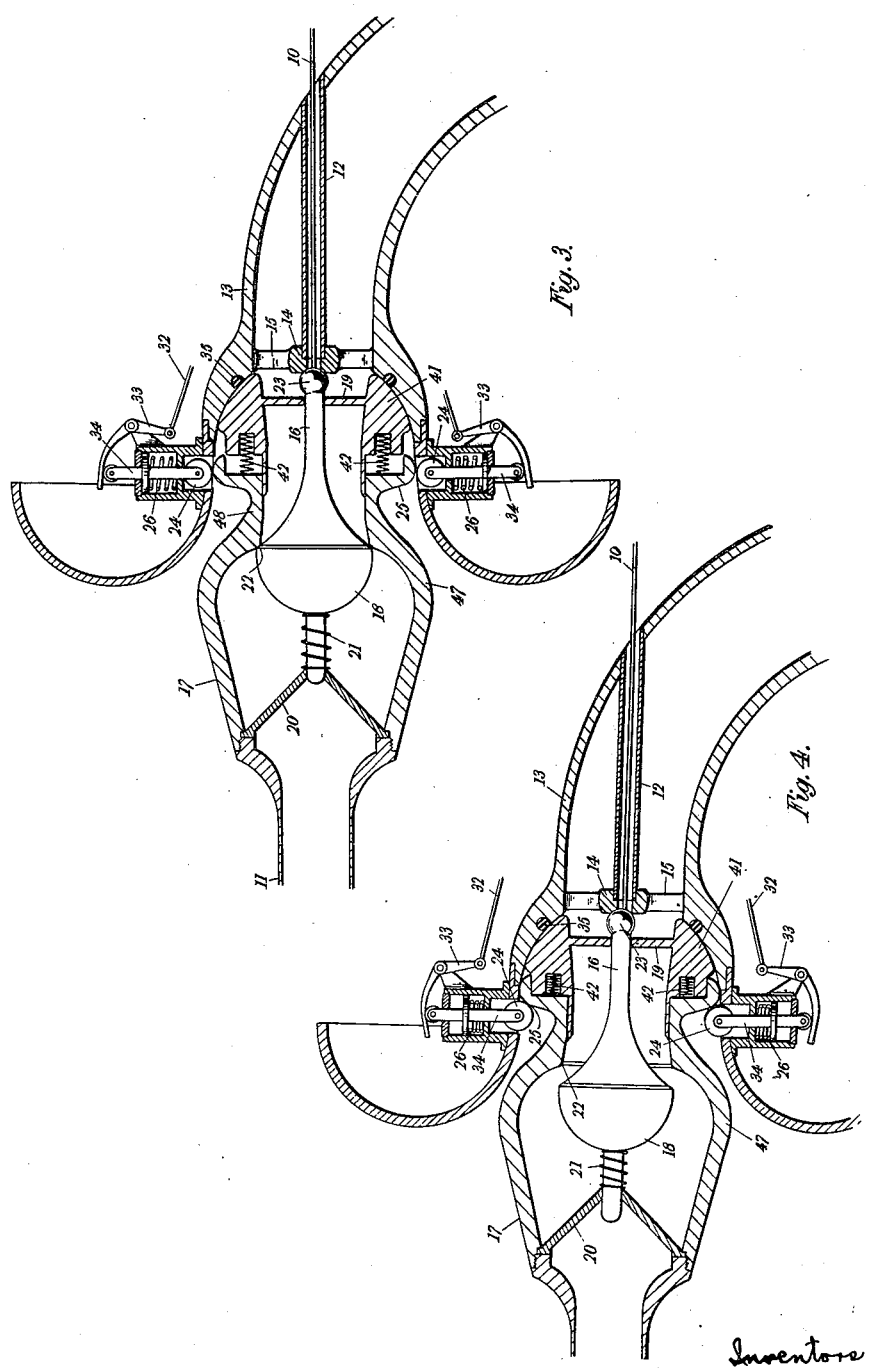

Patented May 7, 1940

2,199,588

UNITED STATES PATENT OFFICE 2,199,588

APPARATUS FOR REFUELING AIRCRAFT IN THE AIR

Alan John Cobham, Hugh Coleman Johnson, and Percy Raymond Allison, Ford Aerodrome, Yapton, England, assignors to Flight Refuelling Limited, Temple, London, England Application May 10, 1938, Serial No. 207,078
In Great Britain December 10, 1936

20 Claims. (Cl. 244—135)

This invention relates to improved apparatus for refueling aircraft in the air.

The procedure generally adopted is for the fuel to be transferred to the aircraft to be refueled through a hose which hangs down from a tanker aircraft. Contact between the two aircraft may for example be established in the manner described in specification No. 432,908.

The invention provides for use in the refueling of an aircraft during flight, the combination of one component of a hose coupling intended to connect a refueling hose carried by one aircraft with a fuel tank of another aircraft, and a device for clamping this component in liquid-tight engagement with a mating component, which device is adapted to yield and release the clamped parts when an abnormal pull is exerted by the hose, the component being so shaped in relation to the shape of the mating component and the disposition and construction of the clamping device being such that the components may be completely separated by the pull of the hose without jamming occurring notwithstanding that the direction of the pull of the hose may vary within substantial limits.

The invention also provides, for use in the refueling of an aircraft during flight, the combination of a reception fitting connected by a fuel pipe to a fuel tank on the aircraft to be refueled, the reception fitting being intended to cooperate with a nozzle fitted to the end of a refueling hose carried by another aircraft, and a device for clamping the nozzle in liquid-tight engagement with the reception fitting, which device is adapted to yield and release the clamped parts when a predetermined separating force is exerted by the hose, the reception fitting being so shaped in relation to the shape of the nozzle and the disposition and construction of the clamping device being such that the nozzle may be completely separated from the reception fitting by the pull of the hose without jamming occurring, notwithstanding the fact that the pull of the hose may be considerably out of alignment with the axis of the reception fitting.

It has been proposed to establish a connection between a nozzle on a refueling hose and a reception fitting on the aircraft to be refueled by means of a clamping device which will release in an emergency if the pull of the hose becomes abnormal. The importance of so designing the shape of the nozzle and reception fitting and the disposition and location of the clamping device as to prevent jamming has not however been previously recognised.

In one form of the invention a cable or the like attached to the nozzle serves as a means for drawing the nozzle into preliminary engagement with the reception fitting, the clamping device being operative when the nozzle has been brought, by the drawing in of the cable, into preliminary engagement with the reception fitting to effect further movement of the nozzle into clamping engagement with the reception fitting. The nozzle may include a valve which is normally held closed, but which is arranged to be opened on actuation of the clamping device to move the nozzle from its position of preliminary engagement to its position of clamping engagement.

The invention will now be described in further detail with reference to certain examples of construction illustrated in the accompanying drawings, in which:

Fig. 1 is a longitudinal section through one construction showing the nozzle being drawn into the reception fitting;

Fig. 2 is a similar view of the same construction, showing the nozzle after it has been pulled home into the clamping position;

Fig. 3 is a longitudinal section through an alternative construction, showing the nozzle in the position of preliminary engagement with the reception fitting;

Fig. 4 is a similar view of the same arrangement, showing the nozzle having been moved forward into the clamping position and Figs. 5, 6 and 7 are longitudinal sections through three further constructions.

In the construction shown in Figs. 1 and 2, the cable, rope, wire or the like 10, by which the hose 11 is pulled across from the tanker to the receiving aircraft, passes through a side tube 12 leading in from the side of the reception fitting 13 to a central hollow boss 14 supported in the mouth of the reception fitting by a spider 15 or the like. The reception fitting terminates at its rear end in one or more petrol pipes (not shown) for conducting the fuel received from the hose into the petrol tanks of the receiving aircraft. The end of the cable 10 is connected to a rod 16 disposed centrally of a nozzle 17 on the hose (which may be attached to the hose by means of a universal joint) and carrying a valve member 18. The rod, which constitutes the valve stem, is slidably mounted in front and rear spiders 19, 20 rigidly attached to the nozzle, and a compression spring 21 is disposed between the rear spider 20 and the valve member 18 which spring holds the valve member 18 against a seating 22 to close the mouth of the nozzle. As the nozzle 17 on the hose is drawn into the reception fitting 13 by the pull on the cable, a head 23, of ball or mushroom shape, at the front end of the rod 16 comes into contact with the boss 14 through which the cable passes, thereby sealing the side tube 12 and preventing the passage of fuel through it. Under these conditions the hose cannot be pulled further in by the cable, and this position of preliminary engagement of the nozzle with the reception fitting is indicated in chain-dotted lines in Fig. 1.

At the mouth of the reception fitting are one or more clamping rollers, balls or the like 24 (conveniently four) each of which is mounted on a plunger 34. When the head 23 comes into contact with the boss 14 as just described, the rollers 24 contact with the nozzle at the upper edge of the cam surfaces or shoulders 25 behind the curved or spherical interengaged surfaces forming the universal joint between reception fitting 13 and nozzle 17.

A manually operable link system is provided on the liner for applying pressure to the rollers to force them inwards. This system is controlled by a lever 27, located at some distance from the reception fitting, which lever can be moved over about a pivot 30 from the position shown in Fig. 1 into that indicated in Fig. 2 in which it is held by a spring pressed stop 28 which co-operates with an extension 29 on the lever. Fixed to the lever 27 is a link 31 connected by cables 32 to bell cranks 33. These bell cranks abut against the plungers 34. When the lever 27 is moved clockwise about its pivot from the position shown in Fig. 1, the bell cranks 33 are rocked anticlockwise, so as to apply pressure to the rollers 24 to force them inwards and downwards along the cam surfaces 25 on the nozzle and thereby force the latter forwards into its clamping position, in which it makes a liquid-tight joint with the reception fitting 13, as shown in Fig. 2. The reception fitting is provided with a rubber joint ring 35 at its mouth. The valve member 18 is held by the head 23 abutting against the boss 14, so that the valve opens against the action of the spring 21, thereby allowing fuel to flow into the reception fitting.

The front end 36 of the nozzle is curved to the exact male curvature to suit the internal curvature of the reception fitting. As will be appreciated from an inspection of the figures, the radius of the ball end of the nozzle, the dimensions and curvature of the reception fitting and the disposition and construction of the clamping rollers are such as to ensure that the nozzle will leave the reception fitting without jamming notwithstanding that the pull of the hose may be at a substantial angle to the axis of the reception fitting.

If there should be a sudden pull on the hose during refuelling, e. g. owing to a bump, sufficient to overcome the force of the spring 40 associated with the stop 28, the bell cranks 33 will be turned clockwise about their pivots by the action of the cam surfaces 25 on the locking rollers 24, thereby pulling the handle 27 back into the position shown in Fig. 1, and allowing the nozzle to separate from the reception fitting. Instead of employing the spring 40 as the release device for permitting the nozzle to separate from the reception fitting when a predetermined separating force is exerted by the hose, the link 31 connecting the cables 32 and the handle 27 may embody a spring release arranged to yield and uncouple the bell cranks 33 from the handle at the predetermined value of the separating force.

Normally the hose is uncoupled manually at the end of the refueling operation by returning the hand lever 27 to its original position shown in Fig. 1, thereby releasing the pressure of the rollers 24 on the nozzle, allowing them to be returned to the off position by springs 26, and enabling the hose to be pulled back into the tanker taking the cable with it.

The attachment of the cable 10 is made to the head 23 on the rod 16 by a cut-away opening (not shown) at one end of the rod to permit a ball fixed to the end of the cable to enter into this cut-away. The cable is fixed at its inner end to a drum which forms part of the hauling gear on the receiving aircraft. When the hose has been wound back to the tanker the cable can be readily detached from it by uncoupling the joint, and can then be wound back into the receiving aircraft. Alternatively, provision may be made for disconnecting the cable from the nozzle on the receiving aircraft.

As an alternative to the arrangement illustrated in Figs. 1 and 2, the cable 10, instead of being attached to the head 23, may pass through a bore in the centre of the rod 16 and be attached to the spider 20 at the rear of the nozzle. In this case the pull of the cable will draw the nozzle right home, past the position of preliminary engagement and into the position of clamping engagement, the valve opening when further forward movement of the rod 16 is prevented by the head 23 contacting with the abutment 14. The inward movement of the rollers 24 consequent upon actuation of the handle 27 will then serve only to clamp the nozzle in liquid-tight engagement with the reception fitting, without effecting further forward movement of the nozzle.

Again, it should be understood that the provision of a valve in this and the other constructions illustrated is by no means essential. All that is needed is an abutment on the nozzle to seal the passage by which the cable passes into the reception fitting when the nozzle is in the locking position. Where there is no valve in the nozzle the flow of fuel is of course controlled by valves on the supply aircraft which would not be opened until after the nozzle has been clamped into the reception fitting.

In the construction shown in Figs. 3 and 4, in the position of preliminary engagement of the nozzle 17 with the reception fitting 13 shown in Fig. 3, the nozzle is in liquid-tight engagement with the reception fitting.

The nozzle 17 is adapted to be pulled right home into the reception fitting 13 by the pull on the cable 10, and, after the nozzle has been so pulled home, actuation of the manually operable gear (the non-illustrated parts of which are similar to the corresponding parts in Figs. 1 and 2) causes forward movement of the rear part of the nozzle relatively to the forward part thereof, which is held fixed by the reception fitting, thereby opening the valve.

It will be appreciated that in this construction, as well as that illustrated in Figs. 1 and 2, the link system for actuating the clamping rollers 24 could, if desired, be replaced by a hydraulic or electrical system, provided some form of quick release is incorporated, which will enable the clamping device to release the clamped parts under an abnormal pull on the hose.

The rear portion 47 of the nozzle is fixed to the hose pipe 11 and is formed near its forward end with an annular groove 48, the forward side 25 of which constitutes a cam surface to co-operate with the locking rollers 24.

On the front of this rear portion is slidably mounted a nose piece 41, having its forward end shaped to fit the reception fitting. A number of springs 42, conveniently four, are interposed between the rear portion 47 of the nozzle and the nose piece 41, and tend to hold the latter in its forward position.

Within the nozzle is disposed a valve 18, which is normally held by a spring 21, abutting at its rear end against a spider 20 attached to the rear portion of the nozzle, against a rearwardly facing valve seating 22 formed on the interior face of the said rear portion. The valve stem 16 projects forwardly through a spider 19 fixed to the nose piece 41 and acting as a guide for the valve stem.

At its forward end, the valve stem terminates in a head 23 to which is attached the cable 10 for drawing in the hose. The head 23 is substantially flush with the front end of the nose piece.

With this arrangement the nose piece can be drawn fully home into the reception fitting by a pull on the cable, and in this position the head 23 on the valve stem will just contact with an abutment 14 which prevents further forward movement of the valve. If the manually operable gear is now actuated, the clamping rollers 24 will move in, and force the rear portion 47 of the nozzle forward relatively to the valve 18 and to the nose piece 41, thereby compressing the springs 42 and opening the valve so as to permit fuel to flow from the hose into the reception fitting (see Fig. 4).

With this arrangement very little strain is imposed on the manually operable gear, as it only needs to move the rear portion of the nozzle forwards for a small distance compared with the distance that the nozzle has to be moved forward by the corresponding gear in the arrangement shown in Figs. 1 and 2. Whereas in that arrangement the nozzle could only be pulled into the reception cup for a limited distance, leaving it lying at an angle to the parallel of the receiver and depending for being finally brought into position, upon the manual operation of the toggles, in the construction shown in Figs. 3 and 4, the nozzle is brought right home into the receiver by the pulling in of the cable.

Furthermore, by the pulling in process alone, the valve stem on the nozzle makes a sealed joint with the abutment in the receiver, before the valve can be opened, and also by this bringing into position, the forward part of the nozzle also makes a petrol-tight joint by its abutment on the rubber ring 35 incorporated in the receiver. Thus, by the pulling in process alone, a joint is established which leaves no possibility of loss of petrol during the act of opening the valve. The opening of the valve becomes a much simpler operation, since with the nozzle in position, it is left to the toggles to bear upon the rear portion with a straight thrust, thus opening the valve as a separate operation, independent of the pulling in process.

In the constructions shown in Figs. 5–7, the nozzle 17 is arranged to fit over instead of within the reception fitting.

In the arrangement shown in Fig. 5 a number of levers 43 are pivoted to the exterior of the reception fitting and these carry locking rollers 24 at their ends, which co-operate with cam surfaces 25 on the exterior of the nozzle to force the latter forwards over the mouth of the reception fitting when the levers are moved inwards about their pivots 44.

This inward movement may be effected in various ways. Thus it may be derived from a sleeve 45 which is slidable on the exterior of the reception fitting and is connected to the levers 43 by links 46, which incorporate springs (not shown) to enable the clamping device to release the clamped parts when the hose exerts a predetermined separating force. The sleeve may be reciprocated on the reception fitting by any convenient mechanism, such for example as a toggle linkage 49 operated either mechanically or by a fluid controlled piston 50 or spring dashpot. Alternatively the sleeve might be constituted as an annular hydraulic ram and operate in a cylinder disposed coaxially around the reception fitting.

In another arrangement (not illustrated) the ends of the levers 43 may be shaped to fit a cooperating surface on the exterior of the nozzle, the necessary travel being communicated to the nozzle by endwise instead of by pivotal movement of the levers.

In yet another arrangement shown in Fig. 6 the levers 43 are attached to one end to links 51, and at the other are formed with noses 52 to engage the nozzle. Intermediately they rest against spring loaded plungers or fulcrums 54. Between the links is located a cone 53 which slides in the reception fitting and can be moved by manipulation of a linkage 55 or hydraulic means to spread the ends of the levers 43 so that their noses 52 approach one another and force the nozzle into clamping engagement with the reception fitting. If the pull on the cable should at any time become excessive the springs 56 will yield and allow the nozzle and reception fitting to separate.

The links 51 at the ends of the levers 43 are for retracting them out of position when not in use.

The ball end of the reception fitting may be fitted with a thin spherical metallic cup 57, as shown in Fig. 7. This may move over the cooperating surface of the nozzle so as to allow of small angular movements of the nozzle caused by variations in the trailing angle of the hose.

Parts that are liable to bump against each other may be vulcanised or covered with India rubber or a similar material in order to deaden the force of impact and therefore, prevent fracture of the parts.

What is claimed is:

1. A hose coupling comprising a nozzle, a reception fitting therefor and having a wall provided with an aperture, a valve in the nozzle having a stem, a cable attached to the stem, and means for drawing the cable through said aperture, said stem being adapted to close said aperture.

2. In a hose coupling, a nozzle member, a valve in the nozzle member and having a stem, a cable connected to the valve stem, and a reception fitting having guide means through which the cable passes, said guide means being disposed for abutment by said stem to open the valve.

3. A hose coupling comprising a nozzle, a valve in the nozzle and having a stem, a cable connected to the stem, a reception fitting provided with an aperture, means for drawing the cable through said aperture, said valve stem being adapted to abut against a part of the reception fitting and to close the aperture, and a clamping device for causing relative movement between the nozzle and reception fitting, whilst the valve stem abuts against the reception fitting and thereby causing said valve to open.

4. In apparatus for transferring fluid between two aircraft during flight, a transfer hose connected at one of its ends to one of said aircraft; a first coupling component connected to the other end of said hose; a second and mating coupling component mounted on the other aircraft, said components being so shaped as cooperatively to interengage in substantially fluid tight fluid-transferring relation; and inwardly movable yieldable means on said other aircraft contractible about said first component for holding it coupled to said second component against normal pull of the hose, the construction and interengagement of said yieldable means and said first component being such that, under the influence of an abnormal pull exerted by the hose in any of a number of different directions varying within substantial limits, said first component will be released by said yieldable means and from interengagement with said second component without jamming.

5. In apparatus for transferring fluid between two aircraft during flight, a transfer hose connected at one of its ends to one of said aircraft; mating coupling components respectively connected to the other end of said hose and mounted on the other aircraft; means for moving said components relatively into coupled relation including a device mounted on said other aircraft for movement into engagement with one of said components for driving it into coupled relation with the other component, and actuating means mounted on and controllable by an operator on said other aircraft normally permitting independent operation of said device and movable to force said device into drive-effecting engagement with said one component after initial engagement of the components; and yieldable means for urging said device to bear upon said one component to hold it releasably in coupled relation with said other component, said yieldably urged device, said actuating means, and said components being so constructed and arranged that, under the influence of an abnormal pull exerted by the hose in any of a number of different positions varying within substantial limits due to different directions of extent of the hose, said one component will be released by said device and completely separated from said other component without jamming.

6. In apparatus for transferring material between two aircraft during flight, a transfer hose connected at one of its ends to one of said aircraft; a first coupling component connected to the other end of said hose; a second and mating coupling component mounted on the other aircraft; a device mounted on said other aircraft and engageable with said first component for releasably holding it coupled to said second component; yieldable means for applying a holding force to said device; and actuating means mounted on and controllable by the operator of said other aircraft for applying force to said device other than the force applied by said yieldable means for forcing said first component into coupled relation to said second component.

7. In apparatus as set forth in claim 4, a draw cable connected to said first coupling component; and means on said other aircraft for positioning and guiding the cable substantially along the axis of said second component to pull said first component into preliminary coupling engagement with said second component.

8. Apparatus as set forth in claim 4 in which said first component is formed with a cam surface and in which said yieldable means comprises a member positioned and urged to bear upon the cam surface.

9. A hose coupling comprising in combination two mating components so shaped as cooperatively to interengage; yieldable means for engaging a first one of said components under predetermined tension and holding it coupled to the other component against normal pull of the hose but said predetermined tension being of a degree to release said components to permit complete separation of said components under abnormal pull of the hose; a draw cable connected to said first component; and means guiding said cable substantially axially of and into the other component.

10. In a tubular coupling component in the refueling line of an airplane, a portion of said tubular coupling component disposed to be interengaged fuel tight by a coacting surface of an associated coupling component of a supply line carried on another airplane, releasable means carried by said tubular coupling component adapted for locking contact against the associated coupling component, and control mechanism to maintain the releasable means in locking position, said control mechanism being constructed and arranged for movement to inactive position incident to retraction of the releasable means through abnormal pull on a coupling component.

11. In a tubular coupling component in the refueling line of an airplane adapted to be interengaged fuel tight by a coacting surface of an associated coupling component of a supply line carried on another airplane, releasable means carried by the tubular coupling component adapted for locking contact against the associated coupling component and adapted for retraction through the action of the associated coupling component in the event of abnormal pull on one of the coupling components, and mechanism operable to move said releasable means to locking position, said mechanism being movable to inactive position through said retraction.

12. In a tubular coupling component in the refueling line of an airplane adapted to be interengaged fuel tight by a coacting surface of an associated coupling component of a supply line carried on another airplane, a draw member adapted for attachment substantially centrally to the associated coupling component, and guide means through which said draw member passes located in the tubular coupling component with its inner end substantially centrally thereof.

13. In a tubular coupling component in the refueling line of an airplane, a rounded portion on said component disposed to be interengaged fuel tight by a coacting rounded surface of an associated coupling component of a supply line carried on another airplane, a draw member adapted for attachment substantially centrally to the associated coupling component, and a guide tube through which the draw member passes at a location substantially centrally of the tubular coupling component, said guide tube at said location being adapted for closing by a part on the associated coupling component.

14. In a tubular coupling component in the refueling line of an airplane, a portion on said tubular coupling component adapted to be interengaged fuel tight by a coacting surface of an associated coupling component of a supply line carried on another airplane and provided with a shoulder, radially movable means carried by the tubular coupling component disposed for wedging contact against the shoulder to impart axial tightening movement to the tubular coupling component, and means to normally maintain said contact constrained but being yieldable in response to abnormal pull on a coupling component.

15. In a tubular coupling component in the refueling line of an airplane, a rounded portion on said tubular coupling component adapted to be interengaged fuel tight by a coacting rounded surface of an associated coupling component of a supply line carried on another airplane, devices mounted on the tubular coupling component movable laterally toward each other disposed to lock the associated coupling component in the tubular coupling component, operating means movable substantially axially of the tubular coupling component, and connections between said operating means and said devices.

16. In a tubular coupling component on a fuel supply line of an airplane adapted to be interengaged fuel tight with a coacting surface of an associated coupling component in the refueling line of another airplane, a closure valve in the tubular coupling component normally urged to closed position, an axial extension on said valve, guide means within the tubular coupling component for said extension, said extension projecting outwardly beyond the guide means and adapted at its outer end for abutment against the associated coupling component to open the valve.

17. In a tubular coupling component on a fuel supply line of an airplane adapted to be interengaged fuel tight with a coacting surface of an associated coupling component in the refueling line of another airplane, a closure valve in the tubular coupling component normally urged to closed position, an extension on said valve, guide means, a nose piece slidably mounted on the tubular coupling component at the distal end of the latter, expansive spring means between the nose piece and another part of the tubular coupling component, and a cam surface on said tubular coupling component disposed for engagement by means on the associated coupling component to tighten and lock the tubular coupling component in said interengaged position, said guide means being in the nose piece and engaged by said extension, said extension projecting outwardly beyond the guide means and adapted at its outer end for abutment against the associated coupling component to open the valve.

18. In apparatus for transferring material between two aircraft during flight, means on one aircraft having a coupling component, means on the other aircraft having a coupling component, one of said components having a rounded surface, the other of said components having a rounded surface interengaged by the first rounded surface, a shoulder on said one component behind its rounded surface, a movable device on said other component engageable with said shoulder to normally maintain the components in coupling relation, means urging movement of said device toward and into contact with said shoulder, the latter means being of such predetermined tension as to enable retraction of the device to release one coupling component from the other coupling component through abnormal pull.

19. In apparatus for transferring fluid between two aircraft during flight, a transfer hose connected at one of its ends to one of said aircraft, a first coupling component connected to the other end of said hose, a second and mating coupling component mounted on the other aircraft, said components being so shaped as cooperatively to interengage in substantially fluid tight fluid-transferring relation, a movable device on one component, a shoulder on the other component positioned for engagement by said device when the components are coupled, means urging movement of said device inwardly and into contact with said shoulder, the shoulder-urging means being of such predetermined tension as to enable retraction of the device to release one coupling component from the other coupling component through abnormal pull exerted by the hose in any of a number of different directions varying within substantial limits.

20. In apparatus for transferring fluid between two aircraft during flight, a transfer hose connected at one of its ends to one of said aircraft, a first coupling component connected to the other end of said hose, a second and mating coupling component mounted on the other aircraft, said components being so shaped as cooperatively to interengage in a plurality of movable devices on one component, shoulder means on the other component positioned for engagement by said devices when the components are coupled, springs urging movement of said devices toward and into contact with said shoulder means, said springs being of such predetermined tension as to enable retraction of the devices to release one component from the other component through abnormal pull exerted by the hose in any of a number of different directions varying within substantial limits, elements disposed on said other coupling component to press said device toward said shoulder means, a flexible means connected at opposite ends to said elements, and movable means operable to draw such flexible means between its ends to press said devices toward said shoulder means.

ALAN JOHN COBHAM.
HUGH COLEMAN JOHNSON.
PERCY RAYMOND ALLISON.